United States Patent
Elkanovich et al.

(10) Patent No.: US 12,438,654 B2
(45) Date of Patent: Oct. 7, 2025

(54) COMMUNICATION SYSTEM BETWEEN DIES AND REPAIRING METHOD FOR LANES BETWEEN DIES

(71) Applicants: Global Unichip Corporation, Hsinchu (TW); Taiwan Semiconductor Manufacturing Company, Ltd., Hsinchu (TW)

(72) Inventors: Igor Elkanovich, Hsinchu (TW); Yung-Sheng Fang, Hsinchu (TW); Pei Yu, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 357 days.

(21) Appl. No.: 18/347,595

(22) Filed: Jul. 6, 2023

(65) Prior Publication Data
US 2025/0015939 A1  Jan. 9, 2025

(51) Int. Cl.
H04L 1/22 (2006.01)
H04L 1/00 (2006.01)

(52) U.S. Cl.
CPC .............. H04L 1/22 (2013.01); H04L 1/001 (2013.01); H04L 1/0047 (2013.01)

(58) Field of Classification Search
CPC .......... H04L 1/22; H04L 1/001; H04L 1/0047
See application file for complete search history.

(56) References Cited

U.S. PATENT DOCUMENTS

| | | | |
|---|---|---|---|
| 7,526,705 B2 * | 4/2009 | Boer | H04L 1/1829 714/751 |
| 10,079,211 B1 | 9/2018 | Teh | |
| 10,445,278 B2 * | 10/2019 | Schulz | G06F 13/4291 |
| 11,336,427 B1 | 5/2022 | Elkanovich et al. | |
| 12,015,489 B2 * | 6/2024 | Shilo | H04L 1/08 |
| 2022/0270996 A1 | 8/2022 | Liao et al. | |
| 2022/0350698 A1 | 11/2022 | Iyer et al. | |

FOREIGN PATENT DOCUMENTS

TW  202306370  2/2023

OTHER PUBLICATIONS

"Office Action of Taiwan Counterpart Application", issued on Oct. 20, 2023, p. 1-p. 4.

* cited by examiner

Primary Examiner — Chandrahas B Patel
(74) Attorney, Agent, or Firm — JCIPRNET

(57) ABSTRACT

The disclosure provides a communication system between dies and a repairing method for lanes between dies. The communication system includes a transmitting device disposed on a first die and a receiving device disposed on a second die. During the transmission process in which the transmitting device transmits a data unit stream to the receiving device through a native lane, after the native lane is determined to be a degraded lane, the transmitting device transmits a synchronization flag to the receiving device through a redundant lane to notify a repair time point. During the uninterrupted transmission process of the data unit stream, the transmitting device uses the redundant lane instead of the degraded lane based on the repair time point, and the receiving device uses the redundant lane instead of the degraded lane based on the repair time point notified by the synchronization flag.

24 Claims, 16 Drawing Sheets

FIG. 5

COMMUNICATION SYSTEM BETWEEN DIES AND REPAIRING METHOD FOR LANES BETWEEN DIES

BACKGROUND

Technical Field

The disclosure relates to a communication system, and in particular relates to a communication system between dies and a repairing method for lanes between dies.

Description of Related Art

Digital electronic equipment based on semiconductor integrated circuits, such as mobile phones, digital cameras, personal digital assistants (PDAs), etc., are designed to have more powerful functions to adapt to various applications in the modern digital world. With the manufacturing trend of semiconductor integrated circuits, digital electronic devices are becoming smaller and lighter, as well as having improved functionality and higher performance. Semiconductor integrated circuits may be packaged into 2.5D integrated circuits, that is, several dies/chips may be disposed in the same integrated circuit package. Integrated fan-out (InFO) and chip-on-wafer-on-substrate (CoWoS) packaging technologies may be used to package multiple chips/die connected to each other.

One die may need to be electrically connected to one or more other dies in the same IC package. Contact elements, interposer layers, or redistribution layers (RDL) are configured to make connections between different dies. Communication between different dies may be carried out through one or more lanes. However, one (or more) of the many lanes between dies may be faulty based on the manufacturing process or other factors. Repairing faulty lanes may improve the yield of semiconductor integrated circuits. Traditional lane repair is usually performed statically. That is, the faulty lane is repaired while the transmitting device (one of the dies) stops transmitting data to the receiving device (another die).

However, as the duration of use increases, the aging condition of the lanes between the dies becomes more severe. An aging lane degrades the signal quality, thereby causing the malfunction of semiconductor integrated circuits. Stopping data transmission in order to repair the degraded lane causes a temporary interruption of the system (the system cannot be used), thereby posing challenges to the performance and security of systems (such as vehicular systems). How to repair the degraded lane in real time and dynamically (i.e., the lane may be repaired while transmitting the data without stopping the data transmission) is one of the many technical issues of a communication system between dies.

SUMMARY

A communication system between dies and a repairing method for lanes between dies are provided, so that redundant lanes may be used instead of degraded lanes during an uninterrupted transmission.

In an embodiment of the disclosure, the communication system includes a first transmitting device disposed on a first die and a first receiving device disposed on a second die. The first die and the second die are disposed in the same integrated circuit package. The first transmitting device transmits at least one first data unit stream to the first receiving device through at least one native lane. During a continuous transmission process of the at least one first data unit stream, after one of the at least one native lane is determined to be a degraded lane, the first transmitting device transmits at least one synchronization flag to the first receiving device through a redundant lane to notify a repair time point. During the continuous transmission process (uninterrupted transmission process) of the at least one first data unit stream, the first transmitting device uses the redundant lane instead of the degraded lane based on the repair time point to continue data unit stream transmission of the first transmitting device, and the first receiving device uses the redundant lane instead of the degraded lane based on the repair time notified by the at least one synchronization flag to continue data unit stream reception of the first receiving device.

In an embodiment of the disclosure, the repairing method includes the following operation. At least one first data unit stream is transmitted by a first transmitting device disposed on a first die to a first receiving device disposed on a second die through at least one native lane. The first die and the second die are disposed in the same integrated circuit package. During a continuous transmission process of the at least one first data unit stream, after one of the at least one native lane is determined to be a degraded lane, at least one synchronization flag is transmitted to the first receiving device through a redundant lane by the first transmitting device to notify a repair time point. During the continuous transmission process of the at least one first data unit stream, the redundant lane is used instead of the degraded lane based on the repair time point by the first transmitting device to continue data unit stream transmission of the first transmitting device. During the continuous transmission process of the at least one first data unit stream, the redundant lane is used instead of the degraded lane based on the repair time notified by the at least one synchronization flag by the first receiving device to continue data unit stream reception of the first receiving device.

Based on the above, during the continuous transmission process of the data unit stream, when a certain native lane is determined to be a degraded lane, the first transmitting device may immediately transmit a synchronization flag to the first receiving device through the redundant lane to notify a repair time point. Therefore, on the premise of not affecting the continuous transmission process of the data unit stream, the lane repair time point of the first transmitting device and the first receiving device may be synchronized. During the uninterrupted transmission process of the data unit stream, the first transmitting device and the first receiving device may use the same redundant lane instead of the degraded lane synchronously. Therefore, the communication system may use the redundant lane to repair the degraded lane in the uninterrupted transmission process.

In order to make the above-mentioned features and advantages of the disclosure comprehensible, embodiments accompanied with drawings are described in detail below.

BRIEF DESCRIPTION OF THE DRAWINGS

FIG. 5 is a structural schematic diagram of a contact element pattern according to an embodiment of the disclosure.

DETAILED DESCRIPTION OF DISCLOSED EMBODIMENTS

Figure 1:
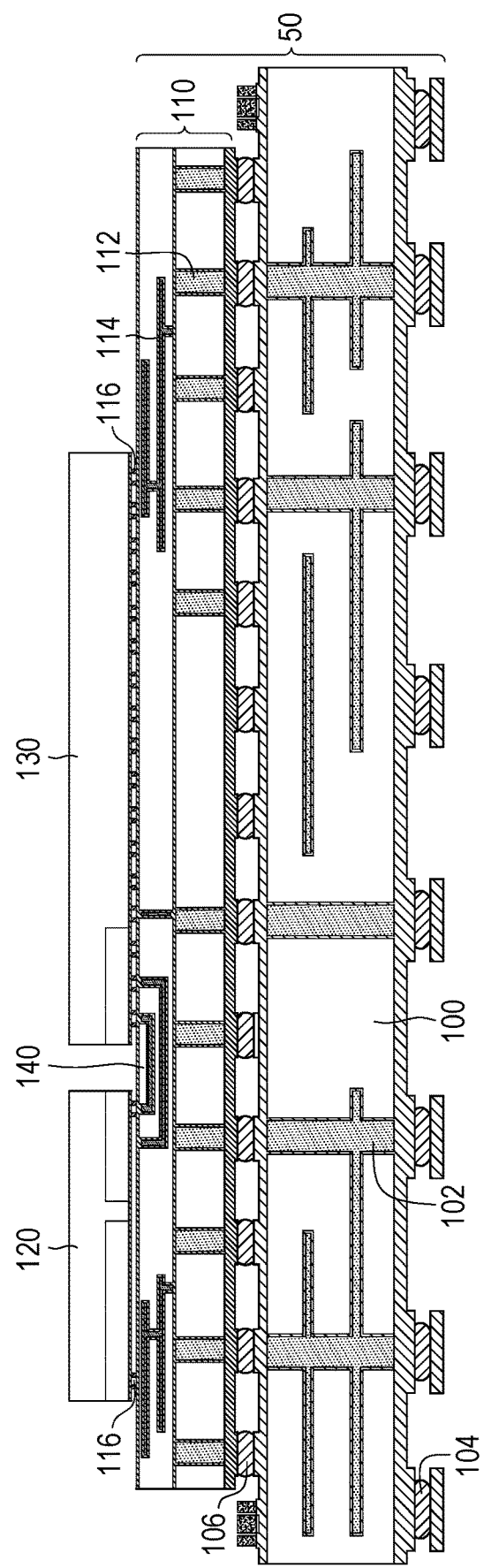
FIG. 1 is a schematic diagram of a cross-sectional stacked structure of a 2.5D semiconductor integrated circuit with a communication interface according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

The disclosure relates to data transmission and management between two devices (e.g., two dies). Several embodiments are provided below to introduce the disclosure, but the implementation of the disclosure is not limited to the embodiments.

The entire integrated circuit may be manufactured into a semiconductor integrated circuit by a semiconductor manufacturing process, and the semiconductor integrated circuit may be manufactured based on a stacked structure of a 2.5D semiconductor integrated circuit. The interface of the receiving device in the die may include a frame decoding circuit associated with a de-serialized circuit. In some embodiments, the interface in the semiconductor structure is integrated in the entire integrated circuit.

First, semiconductor manufacture is described. FIG. 1 is a schematic diagram of a cross-sectional stacked structure of a 2.5D semiconductor integrated circuit with a communication interface according to an embodiment of the disclosure. Referring to FIG. 1, a chip-on-wafer-on-substrate (CoWoS) or an integrated fan-out (InFO) platform 50 having the expected integrated circuit structure is formed based on a 2.5D packaging technique. The CoWoS or InFO platform 50 may include a package substrate 100 having a bottom solder ball 104 and a top contact element 106. A via 102 may be used to connect from the bottom solder ball 104 to the top contact element 106. Moreover, an interposer layer or a redistribution layer (RDL) 110 may be further formed on the substrate 100 and connected to the contact element 106. The interposer layer or the redistribution layer 110 is embedded with a routing structure 140, in which the routing structure 140 has a routing path for connection purposes. The interposer layer or the redistribution layer 110 may further include a through-silicon-via (TSV) 112, an interconnect wiring 114, and a contact element 116. Here, depending on the manufacturing process adopted, the contact element 116 may be a via or a contact element or any suitable connection structure for terminal-to-terminal contact. The present embodiment does not limit the contact elements 106 and 116 to a particular type.

In actual application, the CoWoS or InFO platform 50 may also be implemented with an additional die, such as an application-specific integrated circuit (ASIC) die 130 and a serializer-deserializer (SerDes) die 120. The ASIC die 130 and the SerDes die 120 are connected by the routing structure 140 (the wiring 114 and the contact element 116). One ASIC die 130 may be connected with multiple SerDes dies 120 for various peripheral communications.

Figure 2:
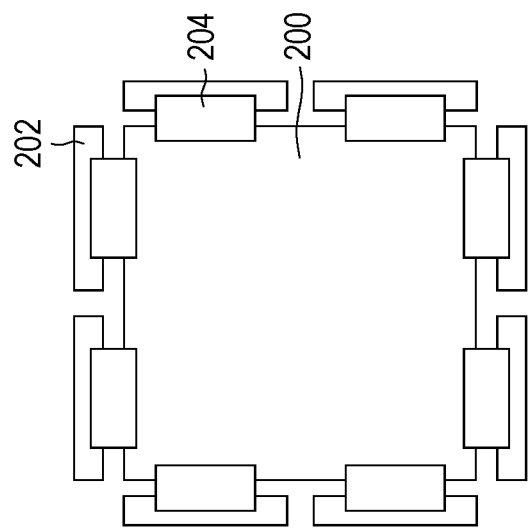
FIG. 2 is a top schematic diagram of a die connected to multiple other dies through communication interfaces according to an embodiment of the disclosure.

FIG. 2 is a top schematic diagram of a die connected to multiple other dies through communication interfaces according to an embodiment of the disclosure. Referring to FIG. 2, one die 200 (e.g., a processor or an ASIC die) may be connected to multiple dies 202 through a communication interface 204, so that data may be transmitted between the die 200 and the dies 202. The communication interface 204 may contain a wiring and a contact element in a contact element pattern such that the die 200 may be connected to the dies 202.

Figure 3:
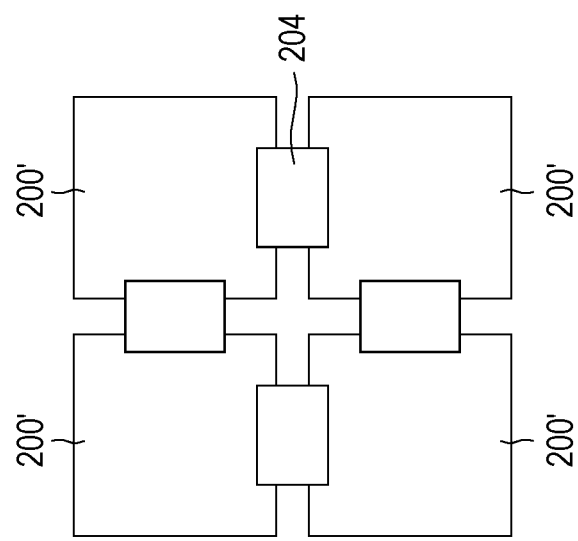
FIG. 3 is a top schematic diagram of multiple dies connected to each other through communication interfaces according to another embodiment of the disclosure.

FIG. 3 is a top schematic diagram of multiple dies connected to each other through communication interfaces according to another embodiment of the disclosure. Referring to FIG. 3, multiple processor dies 200' may be connected together to form a large processor having more powerful functions. In this case, the processor dies 200' are also connected through the communication interface 204.

As previously described, the 2.5D packaging process may be applied to stack various dies side by side without substantially further consuming device area. However, to allow the dies to be connected together more freely, the contact elements in the communication interface 204 need to be suitably arranged in a compact manner and further be symmetrical for receiving and transmitting a signal. The communication between the two dies 200 to 202 may be readily arranged in the peripheral area. Here, the communication interface 204 may also refer to a Glink interface available in the market.

Figure 4:
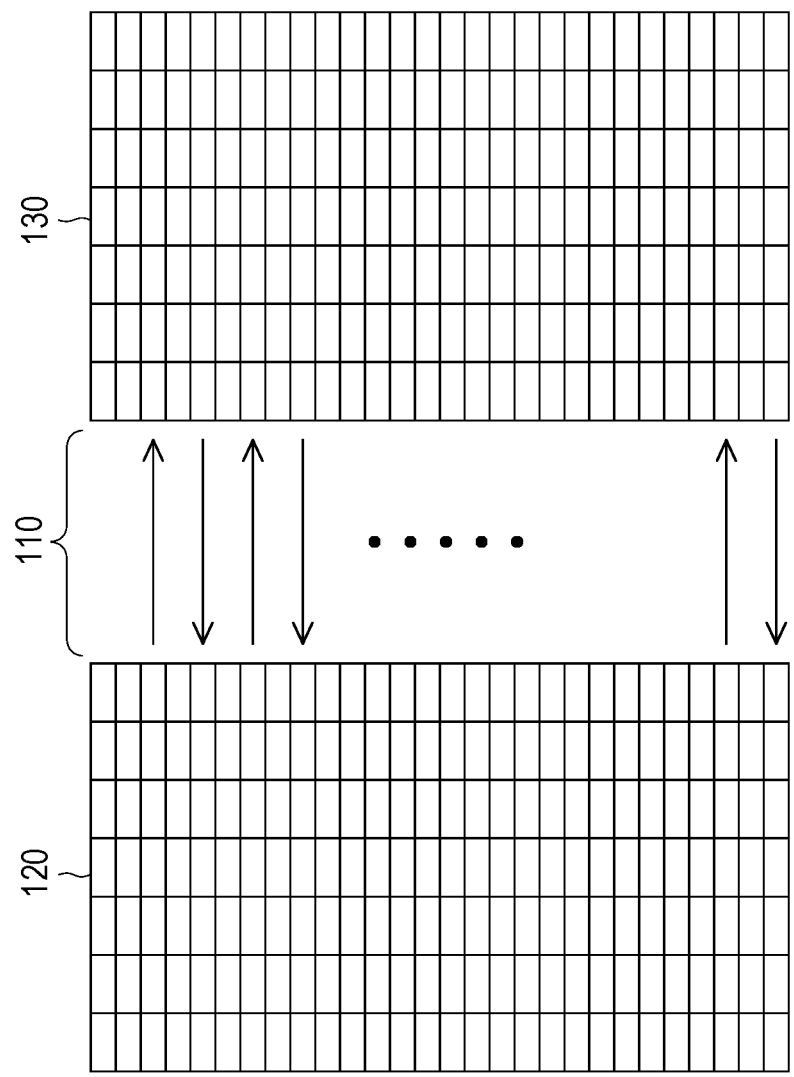
FIG. 4 is a schematic diagram of communication between two dies based on an interface with an interposer layer or a redistribution layer according to an embodiment of the disclosure.

FIG. 4 is a schematic diagram of communication between two dies based on an interface with an interposer layer or a redistribution layer according to an embodiment of the disclosure. Referring to FIG. 4, in an example, the ASIC die 130 and the SerDes die 120 communicate through an interposer layer or the redistribution layer 110. Contact elements of the ASIC die 130 and the SerDes die 120 contacting the interposer layer or the redistribution layer 110 are suitably arranged. Each contact element may simultaneously transmit a specific signal. Thus, parallel buses are created based on the contact elements. The signal at each contact element is in a serial format, such as a bit string.

Figure 5:
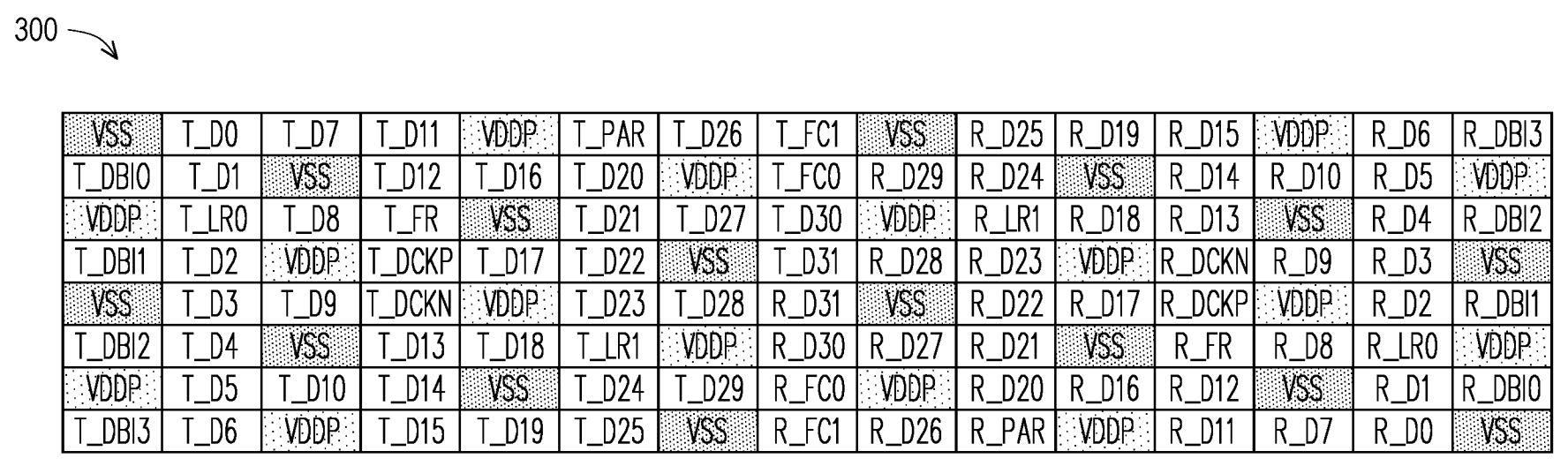

FIG. 5 is a structural schematic diagram of a contact element pattern according to an embodiment of the disclosure. Referring to FIG. 5, the total number of contact elements involved in the communication interface may be one, and signals are transmitted in parallel in the communication interface. The total number of contact elements involved in the communication interface may be a larger number. Signals are transmitted in parallel between dies. According to the size of data in one bus, the size of 32-bit data having operating voltage and other functional signals is set as a slice (refer to a contact element pattern 300). The contact element pattern 300 may be replicated in a certain number (e.g., 8) to accommodate the total data size in parallel communication. In an embodiment, the data corresponds to 32 bits having sequences R_D0 to R_D31 and T_D0 to T_D31. On the sequences, T designates a contact element for transmission and R designates a contact element for reception. In addition, the contact element pattern 300 also includes multiple low voltage signals VSS and multiple high voltage signals VDDP. Moreover, various functional signals are also included. The functional signals include FRAM T/R_FR, clock T/R_DCK_P/N, flow control T/R_FC [1:0], DBI T/R_DBI [3:0], parity T/R_PAR, and lane repair T/R_LR [1:0]. However, the contact elements for the functional signals are not limited to the embodiments described.

Table 1 is an example of contact elements defining one transmitting (T) group or receiving (R) group. The transmitting group and the receiving group have the same number of contact elements.

Figure 6:
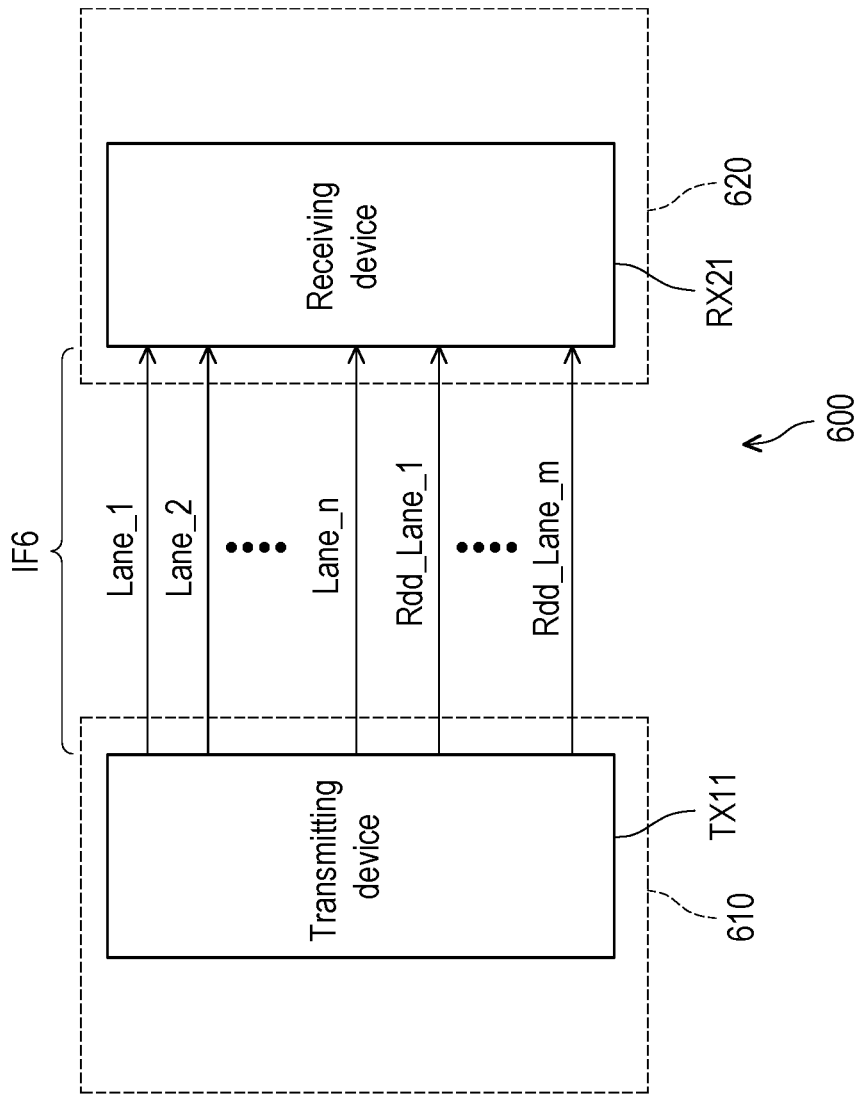
FIG. 6 is a circuit block diagram of a die-to-die communication system according to an embodiment of the disclosure.

FIG. 6 is a circuit block diagram of a die-to-die communication system 600 according to an embodiment of the disclosure. The die-to-die communication system 600 shown in FIG. 6 includes a transmitting device TX11 and a receiving device RX21. The transmitting device TX11 may be disposed on one die 610, and the receiving device RX21 may be disposed on another die 620. The die 610 and the die 620 are disposed in the same integrated circuit package. The die 610 is coupled to the die 620 through the communication interface IF6. For example, the die 610 may be SerDes die 120 and the die 620 may be ASIC die 130. Alternatively, the die 610 and the die 620 may be deduced by referring to the related description of the die 200, the die 202 and/or the processor die 200', and the communication interface IF6 may be deduced by referring to the related description of the communication interface 204. Based on actual design, contact elements, interposer layers and/or redistribution layers (RDL) may be configured to make connections between the die 610 and the die 620.

In the embodiment shown in FIG. 6, the communication interface IF6 includes native lanes Lane_1, Lane_2, . . . , Lane_n and redundant lanes Rdd_Lane_1, . . . , Rdd_Lane_m. The number n of the native lanes Lane_1 to Lane_n and the number m of the redundant lanes Rdd_Lane_1 to Rdd_Lane_m may be any integer determined according to actual design. For example, n is 8 and m is 1 in some embodiments. In other embodiments, n is 16 and m is 1. In yet other embodiments, n is 16 and m is 2. In yet other embodiments, n is 32 and m is 2. In further other embodiments, n is 64 and m is 2. In other embodiments, n is 64 and m is 4.

The transmitting device TX11 may transmit the data unit stream to the receiving device RX21 through the native lanes Lane_1 to Lane_n. When the signal quality of the native lanes Lane_1 to Lane_n is good, the redundant lanes Rdd_Lane_1 to Rdd_Lane_m may be idled (the coding layer circuit of the receiving device RX21 may ignore the redundant lanes Rdd_Lane_1 to Rdd_Lane_m). When the signal quality of one (or more) of the native lanes Lane_1 to Lane_n is poor, one (or more) of the redundant lanes Rdd_Lane_1 to Rdd_Lane_m may be selected for lane repair.

Figure 7:
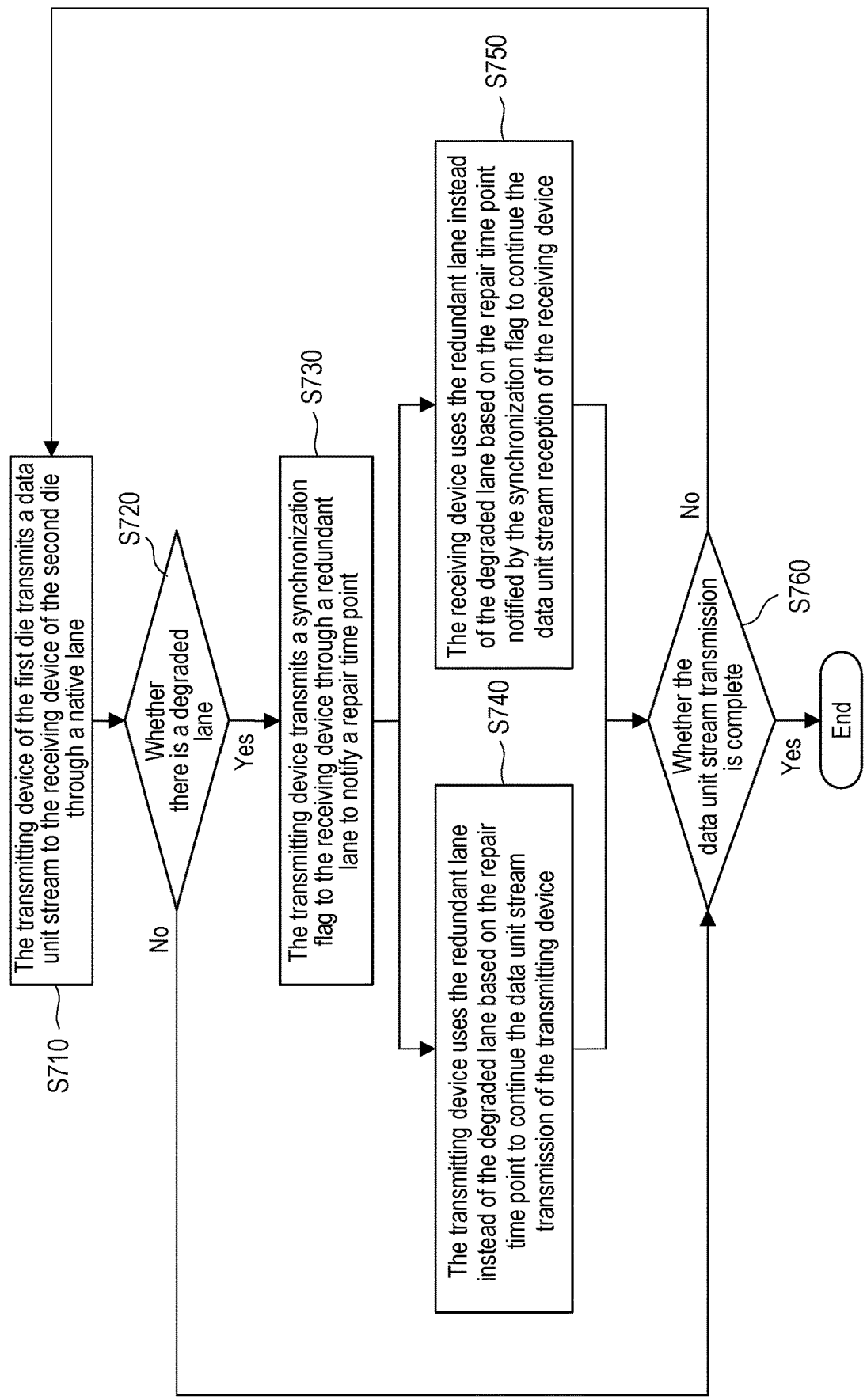
FIG. 7 is a schematic flowchart of a repairing method for lanes between dies according to an embodiment of the disclosure.

FIG. 7 is a schematic flowchart of a repairing method for lanes between dies according to an embodiment of the disclosure. Referring to FIG. 6 and FIG. 7, in step S710, the

TABLE 1

| Contact element type | Number | Definition |
| --- | --- | --- |
| Data, T/R [31:0] | 32 | Data bit synchronized with CLK |
| Frame, T/R_FRAME | 1 | FRAME bit synchronized with CLK |
| Clock, T/R_DCK_P/N | 2 | CLK differential pair |
| Flow control, T/R_FC [1:0] | 2 | Asynchronous and in different directions for data bus |
| DBI, /R_DBI [3:0] | 4 | One DBI per byte for inverting bus content for better single sign-on (SSO) |
| Parity, T/R_PAR | 1 | One per 32 bits, used to identify error conditions |
| Lane repair, T/R_LR [1:0] | 2 | Lane repair bit, used to repair data, parity, and DBI, not used to repair CLK, FRAME, and FC signals. |

Based on the interposer layer or the redistribution layer 110 described above, various signals are communicated between two dies. However, in an example, a set of parallel signals in communication may be converted to a serial format for transmission/reception through one wire having one contact element. Once a serial format data signal is received by the die, the die deserializes the data signal into a parallel format.

transmitting device TX11 transmits n first data unit streams to the receiving device RX21 through the native lanes Lane_1 to Lane_n. In step S720, it may be determined whether there is a degraded lane among all the lanes currently used for transmitting data unit streams between the die 610 and the die 620. When there is no degraded lane (the determination result of step S720 is "no"), steps S730 to S750 are skipped and step S760 is entered. During a continuous transmission process of the data unit stream, after any one of all lanes currently used to transmit the data unit stream between the die 610 and the die 620 is determined to be a degraded lane (the determination result of step S720 is "yes"), the transmitting device TX11 may transmit a synchronization flag to the receiving device RX21 through any one of the redundant lanes Rdd_Lane_1 to Rdd_Lane_m to notify the repair time point.

During the continuous transmission process (uninterrupted transmission process) of the data unit stream, the transmitting device TX11 uses a selected redundant lane among the redundant lanes Rdd_Lane_1 to Rdd_Lane_m instead of the degraded lane based on the repair time point in step S730 to continue the data unit stream transmission of the transmitting device TX11 (step S740). At the same time, during the continuous transmission process (uninterrupted transmission process) of the data unit stream, the receiving device RX21 uses the same selected redundant lane instead of the degraded lane based on the repair time point notified by the synchronization flag to continue the data unit stream reception of the receiving device RX21 (step S750). Step S760 may determine whether the data unit stream transmission is completed. When there are still data units in the data unit stream that have not been transmitted to the receiving device RX21 (the determination result of step S760 is "no"), steps S710 to S750 are executed again.

To sum up, during the continuous transmission process of the data unit stream, when one of the native lanes Lane_1 to Lane_n is determined to be a degraded lane, the transmitting device TX11 may immediately transmit the synchronization flag to the receiving device RX21 through any one of the redundant lanes Rdd_Lane_1 to Rdd_Lane_m (e.g., the redundant lane Rdd_Lane_1) to notify the repair time point. Therefore, on the premise of not affecting the continuous transmission process of the data unit stream, the lane repair time point of the transmitting device TX11 and the receiving device RX21 may be synchronized. During the uninterrupted transmission process of the data unit stream, the transmitting device TX11 and the receiving device RX21 may use the same redundant lane Rdd_Lane_1 instead of the degraded lane synchronously. Therefore, the communication system 600 may use any redundant lane to repair the degraded lane in the uninterrupted transmission process.

Figure 8:
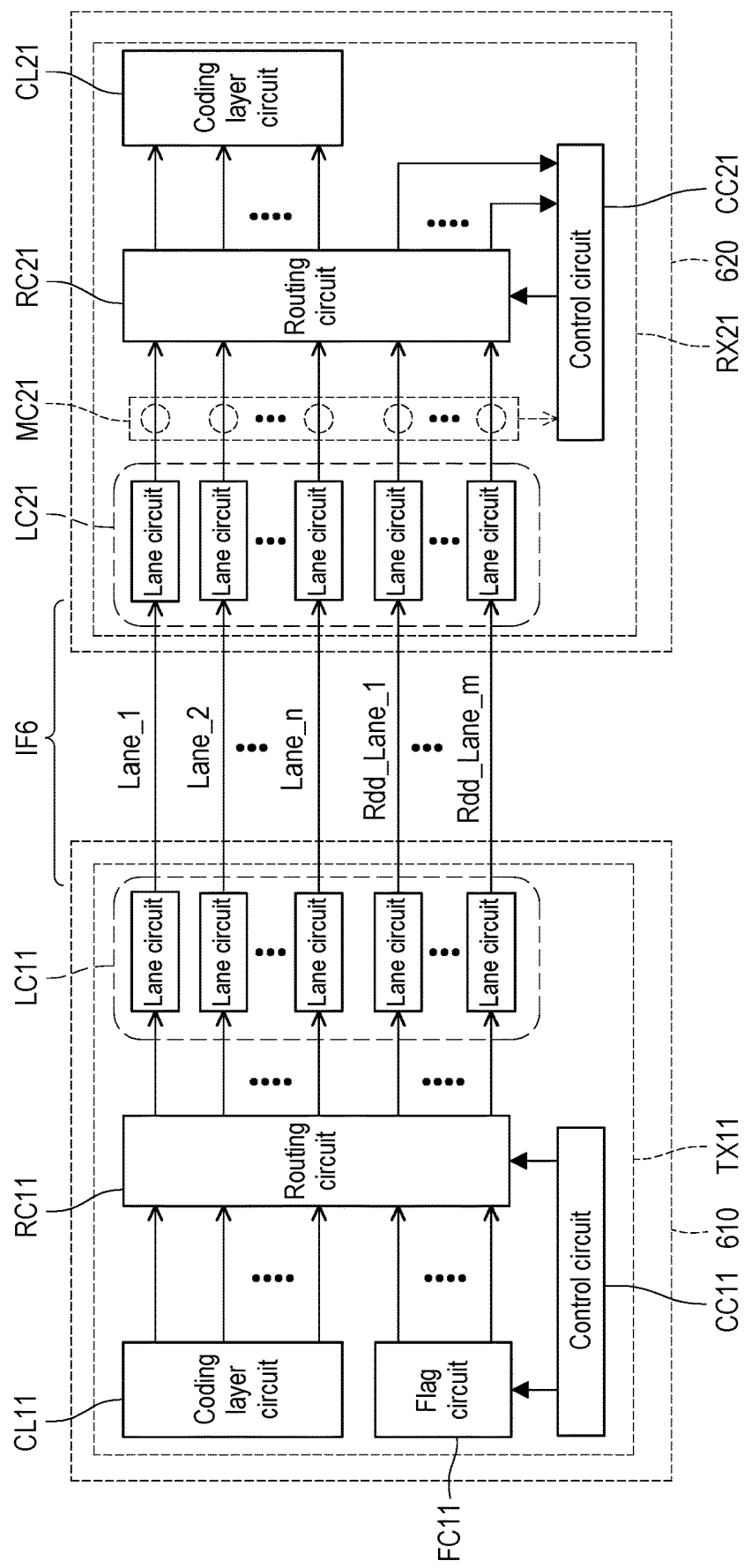
FIG. 8 is a circuit block diagram of a transmitting device and a receiving device according to an embodiment of the disclosure.

FIG. 8 is a circuit block diagram of a transmitting device TX11 and a receiving device RX21 according to an embodiment of the disclosure. The transmitting device TX11 and the receiving device RX21 shown in FIG. 8 may be used as one of many embodiments of the transmitting device TX11 and the receiving device RX21 shown in FIG. 6. In the embodiment shown in FIG. 8, the transmitting device TX11 includes a coding layer circuit CL11, a flag circuit FC11, a routing circuit RC11, a control circuit CC11 and multiple lane circuits LC11. The control circuit CC11 is coupled to the routing circuit RC11 and the flag circuit FC11. The routing circuit RC11 is coupled to the coding layer circuit CL11 and the flag circuit FC11.

According to actual design, in some embodiments, the coding layer circuit CL11 may include a physical coding sublayer (PCS) circuit and/or other coding layer circuits. Based on the output data provided by the previous circuit (not shown in FIG. 8), the coding layer circuit CL11 may provide one or more data unit streams to the routing circuit RC11, and the routing circuit RC11 transmits these data unit streams to different native lanes Lane_1 to Lane_n through different lane circuits LC11 (assuming that the native lanes Lane_1 to Lane_n are all good). The flag circuit FC11 may provide one or more redundant unit streams to the routing circuit RC11, and the routing circuit RC11 transmits these redundant unit streams to different redundant lanes Rdd_Lane_1 to Rdd_Lane_m through different lane circuits LC11 (assuming that the native lanes Lane_1 to Lane_n are good).

When the native lanes Lane_1 to Lane_n are all determined to be good, the routing circuit RC11 may transmit these data unit streams from the coding layer circuit CL11 to the receiving device RX21 through the native lanes Lane_1 to Lane_n, and the routing circuit RC11 may transmit these redundant unit streams from the flag circuit FC11 to the receiving device RX21 through the redundant lanes Rdd_Lane_1 to Rdd_Lane_m. During the continuous transmission process of these data unit streams, after one of the native lanes Lane_1 to Lane_n (e.g., the native lane Lane_2) is determined to be a degraded lane, the flag circuit FC11 generates at least one synchronization flag, the flag circuit FC11 adds the synchronization flag into the redundant unit stream at a corresponding timing, and the routing circuit RC11 transmits the redundant unit with the synchronization flag to the receiving device RX21 through a corresponding redundant lane (e.g., the redundant lane Rdd_Lane_1) among the redundant lanes Rdd_Lane_1 to Rdd_Lane_m to notify the repair time point (the time point of route switching) for the degraded lane (e.g., the native lane Lane_2). During the continuous transmission process of these data unit streams, the routing circuit RC11 may use the redundant lane (e.g., the redundant lane Rdd_Lane_1) used to transmit the synchronization flag instead of the degraded lane (e.g., the native lane Lane_2) based on the repair time point notified to the receiving device RX21 to continue the data unit stream transmission of the transmitting device TX11.

The control circuit CC11 may receive lane quality information about the native lanes Lane_1 to Lane_n and the redundant lanes Rdd_Lane_1 to Rdd_Lane_m through the communication path. Based on actual design, the communication path may be any transmission path. For example, in some embodiments, the communication path may include a sideband path (or sideband lane) between the die 610 and the die 620. In other embodiments, the communication path may include an I$^2$C transmission interface between the die 610 and the die 620. In some other embodiments, the communication path may include a data transmission path between the die 610 and the die 620 (the die 620 may transmit one or more second data unit streams to the die 610 through this data transmission path). In yet other embodiments, the communication path may include an external path outside the IC package. For example, the die 620 may send an interruption to a central processing unit (CPU) (not shown in FIG. 8) outside the die-to-die communication system 600 (integrated circuit package) to trigger the CPU to provide lane quality information to the control circuit CC11. An implementation example of the communication path is described in detail later.

Based on the lane quality information, the control circuit CC11 may determine whether any one of the native lanes Lane_1 to Lane_n and the redundant lanes Rdd_Lane_1 to Rdd_Lane_m is a degraded lane. After the lane quality information indicates that one of the native lanes Lane_1 to Lane_n (e.g., the native lane Lane_2) is determined to be a degraded lane, the control circuit CC11 may control the flag circuit FC11 to add the synchronization flag into the redundant unit stream at a corresponding timing. The control circuit CC11 may control the routing circuit RC11 to transmit the redundant unit stream with the synchronization flag to the receiving device RX21 through one of the redundant lanes Rdd_Lane_1 to Rdd_Lane_m (e.g., the redundant lane Rdd_Lane_1) to notify the repair time point, and the control circuit CC11 may control the routing circuit RC11 to use a redundant lane instead of the degraded lane (e.g., using the redundant lane Rdd_Lane_1 instead of the native lane Lane_2) based on the repair time point to continue the data unit stream transmission of the transmitting device TX11.

In the embodiment shown in FIG. 8, the receiving device RX21 includes a coding layer circuit CL21, a routing circuit RC21, a control circuit CC21, multiple signal quality monitoring circuits MC21, and multiple lane circuits LC21. This embodiment does not limit the implementation details of these signal quality monitoring circuits MC21. For example, the signal quality monitoring circuit MC21 may include well-known signal quality monitoring circuits or other signal quality monitoring elements/circuits. The signal quality monitoring circuit MC21 may monitor signal quality, such as monitoring signal eye opening, amplitude, voltage, or other signal quality characteristics. When the signal quality of a certain lane has a degraded tendency, the lane may be suspected as a degraded lane.

These signal quality monitoring circuits MC21 are respectively disposed on the native lanes Lane_1 to Lane_n and the redundant lanes Rdd_Lane_1 to Rdd_Lane_m. For example, in the embodiment shown in FIG. 8, the signal quality monitoring circuits MC21 are disposed between the lane circuits LC21 and the routing circuits RC21. The control circuit CC21 may monitor the signal quality of the native lanes Lane_1 to Lane_n and the redundant lanes Rdd_Lane_1 to Rdd_Lane_m through these signal quality monitoring circuits MC21. Based on the signal quality of the native lanes Lane_1 to Lane_n and the redundant lanes Rdd_Lane_1 to Rdd_Lane_m, the control circuit CC21 may determine whether any one of the native lanes Lane_1 to Lane_n and the redundant lanes Rdd_Lane_1 to Rdd_Lane_m is a degraded lane.

The control circuit CC21 may notify the transmitting device TX11 through the communication path which one (or which ones) of the native lanes Lane_1 to Lane_n and the redundant lanes Rdd_Lane_1 to Rdd_Lane_m is a degraded lane. Based on actual design, the communication path may be any transmission path. For example, in some embodiments, the communication path may include a sideband path between the die 610 and the die 620. In other embodiments, the communication path may include an I²C transmission interface between the die 610 and the die 620. In still other embodiments, the communication path may include a data transmission path between the die 610 and the die 620. In yet other embodiments, the communication path may include an external path outside the IC package. An implementation example of the communication path is described in detail later.

The routing circuit RC21 is coupled to the coding layer circuit CL21. According to actual design, in some embodiments, the coding layer circuit CL21 may include a physical coding sublayer (PCS) circuit and/or other coding layer circuits. The control circuit CC21 is coupled to the routing circuit RC21 and the signal quality monitoring circuits MC21. The control circuit CC21 may monitor the signal quality of the native lanes Lane_1 to Lane_n through these signal quality monitoring circuits MC21, so as to determine whether any one of the native lanes Lane_1 to Lane_n is a degraded lane. Assuming that the native lanes Lane_1 to Lane_n are all good, the routing circuit RC21 may transmit different data unit streams from the native lanes Lane_1 to Lane_n to the coding layer circuit CL21, and the routing circuit RC21 may transmit the redundant unit streams from the redundant lanes Rdd_Lane_1 to Rdd_Lane_m to the control circuit CC21. At this time, the control circuit CC21 can ignore/discard the redundant unit streams from the redundant lanes Rdd_Lane_1 to Rdd_Lane_m. Assuming any one of the native lanes Lane_1 to Lane_n is a degraded lane, the control circuit CC21 may monitor the redundant unit streams of the redundant lanes Rdd_Lane_1 to Rdd_Lane_m through the routing circuit RC21 to detect which one (or which ones) of these redundant unit streams has a synchronization flag.

It is assumed here that the native lane Lane_2 is determined to be a degraded lane, and the transmitting device TX11 transmits the redundant unit stream with the synchronization flag to the receiving device RX21 through the redundant lane Rdd_Lane_1. After the control circuit CC21 receives the synchronization flag from the redundant lane Rdd_Lane_1 through the routing circuit RC21, the control circuit CC21 may control the routing circuit RC21 to use the redundant lane Rdd_Lane_1 used to transmit the synchronization flag instead of the degraded lane Lane_2 based on the repair time point notified by the synchronization flag to continue the data unit stream reception of the receiving device RX21. Therefore, on the premise of not affecting the continuous transmission process of the data unit stream, the lane repair time point (the time point of lane switching) of the transmitting device TX11 and the receiving device RX21 may be synchronized. During the uninterrupted transmission process of the data unit stream, the transmitting device TX11 and the receiving device RX21 may use the same redundant lane Rdd_Lane_1 instead of the degraded lane Lane_2 synchronously. Therefore, the communication system 600 may use any redundant lane to repair the degraded lane in the uninterrupted transmission process.

Figure 9:
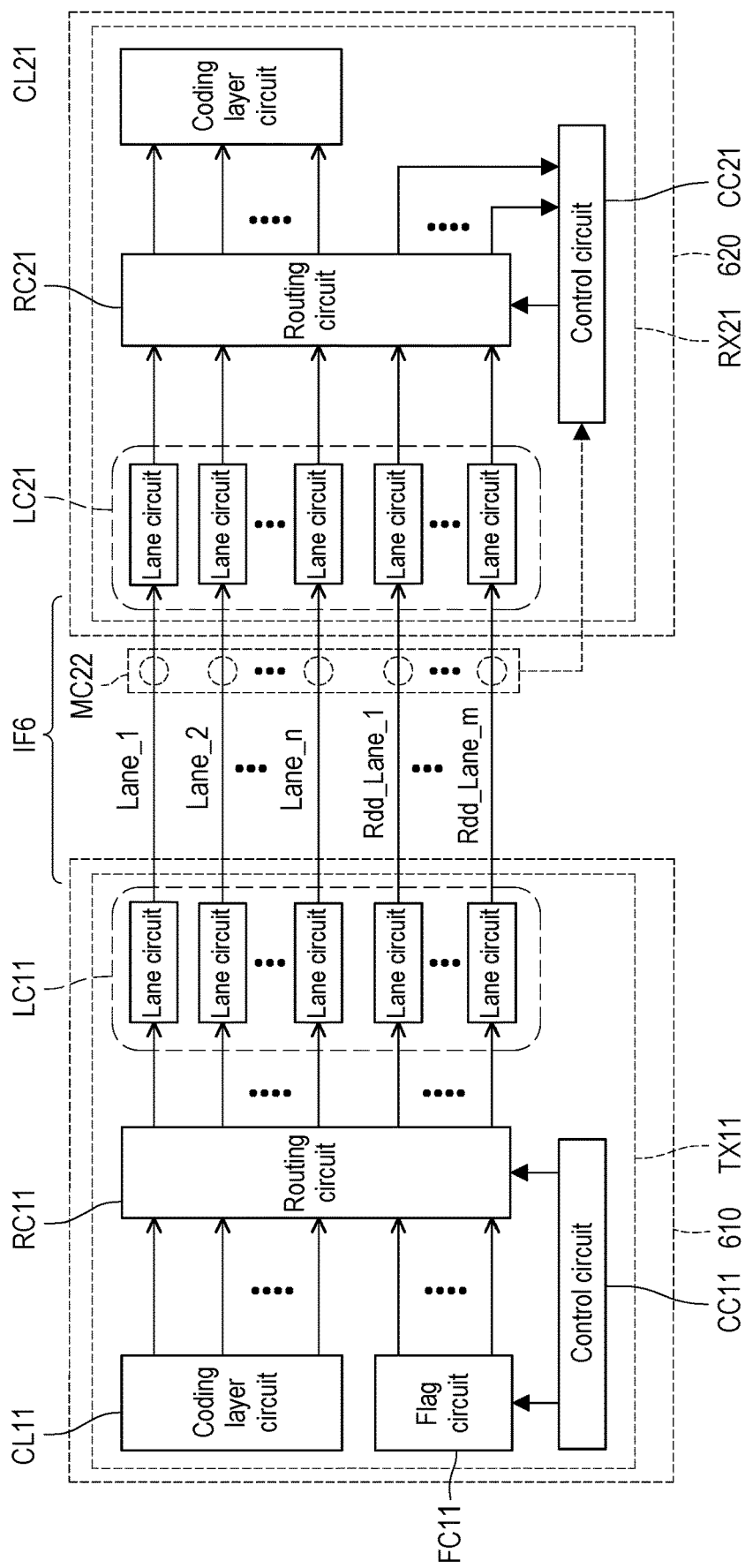
FIG. 9 is a circuit block diagram of a transmitting device and a receiving device according to another embodiment of the disclosure.

FIG. 9 is a circuit block diagram of a transmitting device TX11 and a receiving device RX21 according to another embodiment of the disclosure. The transmitting device TX11 and the receiving device RX21 shown in FIG. 9 may be used as one of many embodiments of the transmitting device TX11 and the receiving device RX21 shown in FIG. 6. In the embodiment shown in FIG. 9, the transmitting device TX11 includes a coding layer circuit CL11, a flag circuit FC11, a routing circuit RC11, a control circuit CC11 and multiple lane circuits LC11, and the receiving device RX21 includes a coding layer circuit CL21, a routing circuit RC21, a control circuit CC21 and multiple lane circuits LC21. For the transmitting device TX11, coding layer circuit CL11, flag circuit FC11, routing circuit RC11, control circuit CC11, lane circuit LC11, receiving device RX21, coding layer circuit CL21, routing circuit RC21, control circuit CC21, and lane circuit LC21 shown in FIG. 9, reference may be made to the related description of the transmitting device TX11, coding layer circuit CL11, flag circuit FC11, routing circuit RC11, control circuit CC11, lane circuit LC11, receiving device RX21, coding layer circuit CL21, routing circuit RC21, control circuit CC21, and lane circuit LC21 shown in FIG. 8, so details are not repeated herein.

In the embodiment shown in FIG. 9, multiple signal quality monitoring circuits MC22 are disposed outside the die 620. These signal quality monitoring circuits MC22 are respectively disposed on the native lanes Lane_1 to Lane_n and the redundant lanes Rdd_Lane_1 to Rdd_Lane_m. The control circuit CC21 may monitor the signal quality of the native lanes Lane_1 to Lane_n and the redundant lanes Rdd_Lane_1 to Rdd_Lane_m through these signal quality monitoring circuits MC22. The signal quality monitoring circuit MC22 shown in FIG. 9 may be deduced by referring to the related description of the signal quality monitoring circuit MC21 shown in FIG. 8, so details are not repeated herein.

Figure 10:
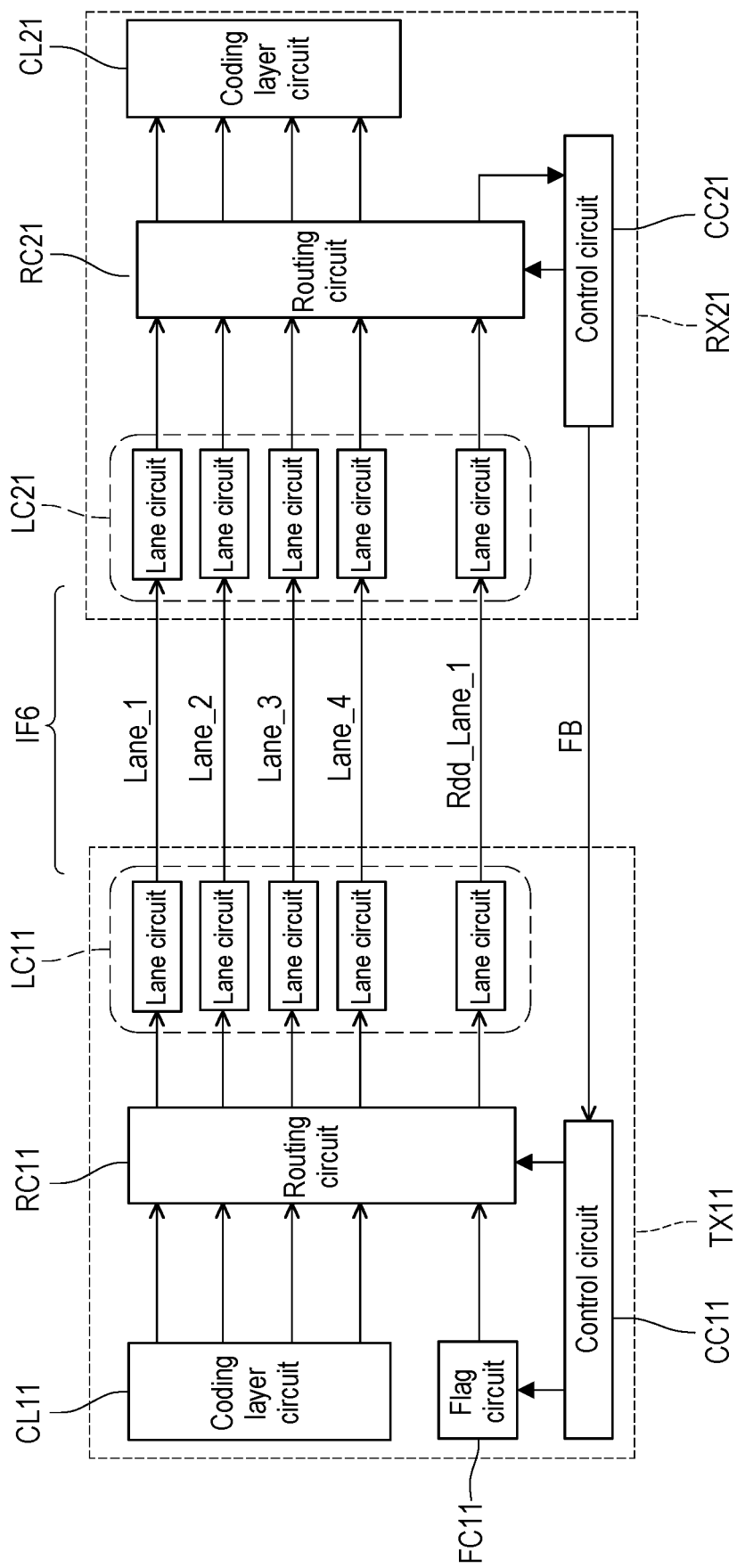
FIG. 10 is a circuit block diagram of a transmitting device and a receiving device according to a specific embodiment of the disclosure.

FIG. 10 is a circuit block diagram of a transmitting device TX11 and a receiving device RX21 according to a specific embodiment of the disclosure. In the embodiment shown in FIG. 10, the transmitting device TX11 includes a coding layer circuit CL11, a flag circuit FC11, a routing circuit RC11, a control circuit CC11 and multiple lane circuits LC11, and the receiving device RX21 includes a coding layer circuit CL21, a routing circuit RC21, a control circuit CC21 and multiple lane circuits LC21. The transmitting device TX11 and the receiving device RX21 shown in FIG. 10 may be used as one of many embodiments of the transmitting device TX11 and the receiving device RX21 shown in FIG. 8 or FIG. 9. In the embodiment shown in FIG. 10, the number n of the native lanes Lane_1 to Lane_n is assumed to be 4 and the number m of the redundant lanes Rdd_Lane_1 to Rdd_Lane_m is assumed to be 1.

When the native lanes Lane_1, Lane_2, Lane_3, and Lane_4 are all determined to be good, the routing circuit RC11 may transmit these data unit streams from the coding layer circuit CL11 to the receiving device RX21 through the native lanes Lane_1, Lane_2, Lane_3, and Lane_4, and the routing circuit RC11 may transmit the redundant unit stream from the flag circuit FC11 to the receiving device RX21 through the redundant lane Rdd_Lane_1. The routing circuit RC21 may transmit the different data unit streams from the native lanes Lane_1 to Lane_4 to the coding layer circuit CL21, and the control circuit CC21 may monitor the redundant unit stream of the redundant lane Rdd_Lane_1 through the routing circuit RC21 to detect whether there is a synchronization flag in the redundant unit stream.

The control circuit CC21 may notify the control circuit CC11 through the communication path FB which one (or which ones) of the native lanes Lane_1 to Lane_4 and the redundant lane Rdd_Lane_1 is a degraded lane. Based on actual design, the communication path FB may be any transmission path. For example, in some embodiments, the communication path FB may include a sideband path between the die 610 and the die 620. In other embodiments, the communication path FB may include an I²C transmission interface between the die 610 and the die 620.

During the continuous transmission process of these data unit streams by the native lanes Lane_1 to Lane_4, after one of the native lanes Lane_1 to Lane_4 (e.g., the native lane Lane_4) is determined as a degraded lane, the flag circuit FC11 adds one (or more) synchronization flags into the redundant unit stream at a corresponding timing, and the routing circuit RC11 transmits the redundant unit stream with the synchronization flag to the receiving device RX21 through a redundant lane Rdd_Lane_1 to notify the repair time point (the time point of route switching) for the degraded lane (e.g., the native lane Lane_4).

During the continuous transmission process of these data unit streams, the routing circuit RC11 may use the redundant lane Rdd_Lane_1 used to transmit the synchronization flag instead of the degraded lane (e.g., the native lane Lane_4) based on the repair time point notified to the receiving device RX21 to continue the data unit stream transmission of the transmitting device TX11. At the same time, after the control circuit CC21 receives the synchronization flag from the redundant lane Rdd_Lane_1 through the routing circuit RC21, the control circuit CC21 may control the routing circuit RC21 to use the redundant lane Rdd_Lane_1 used to transmit the synchronization flag instead of the degraded lane Lane_4 based on the repair time point notified by the synchronization flag to continue the data unit stream reception of the receiving device RX21. Therefore, under the premise of uninterrupting the transmission process of the data unit stream, the lane repair time point of the transmitting device TX11 and the receiving device RX21 (the switching time point of the routing circuit RC11 and the switching time point of the routing circuit RC21) may be synchronized, so that the transmitting device TX11 and the receiving device RX21 may use the same redundant lane Rdd_Lane_1 instead of the degraded lane Lane_4 synchronously. Therefore, the communication system 600 may use the redundant lane Rdd_Lane_1 to repair any degraded lane in the uninterrupted transmission process.

Figure 11:
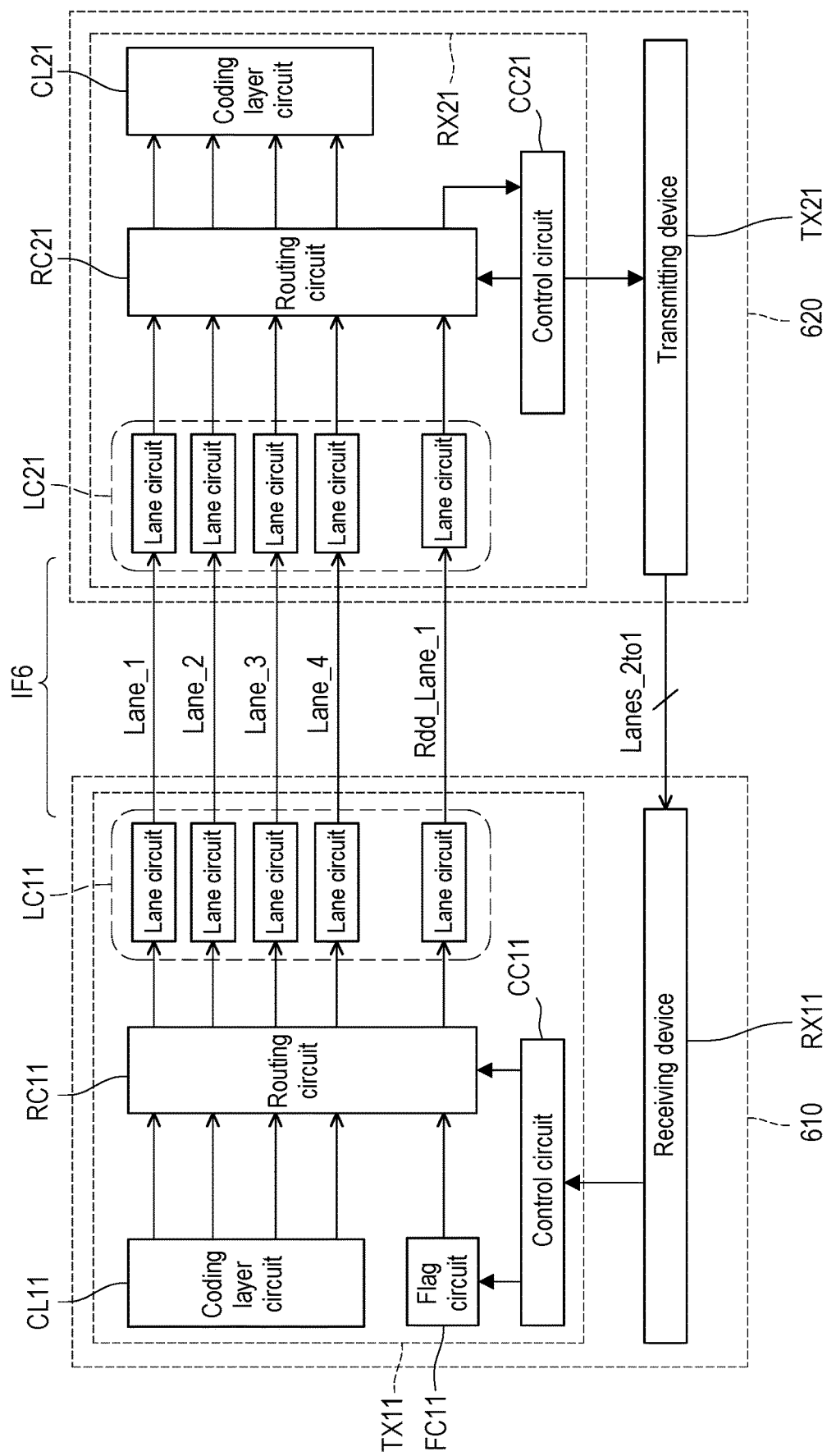
FIG. 11 is a circuit block diagram of a die according to another specific embodiment of the disclosure.

FIG. 11 is a circuit block diagram of the die 610 and the die 620 according to another specific embodiment of the disclosure. In the embodiment shown in FIG. 11, the die 610 includes a transmitting device TX11 and a receiving device RX11, and the die 620 includes a receiving device RX21 and a transmitting device TX21. The transmitting device TX11, the receiving device RX21, the native lanes Lane_1 to Lane_4, and the redundant lane Rdd_Lane_1 shown in FIG. 11 may be deduced by referring to the related description of the transmitting device TX11, the receiving device RX21, the native lanes Lane_1 to Lane_4, and the redundant lane Rdd_Lane_1 shown in FIG. 10. The transmitting device TX21 may be deduced by referring to the related description of the transmitting device TX11, the receiving device RX11 may be deduced by referring to the related description of the receiving device RX21, and the data transmission path Lanes_2to1 between the transmitting device TX21 and the receiving device RX11 may be deduced by referring to the related description of the native lanes Lane_1 to Lane_4 and the redundant lane Rdd_Lane_1, so they are not repeated herein.

In the embodiment shown in FIG. 11, the receiving device RX11 receives the second data unit stream from the transmitting device TX21 through the data transmission path Lanes_2to1, the control circuit CC21 of the receiving device RX21 may transmit the lane quality information related to the native lanes Lane_1 to Lane_4 and the redundant lane Rdd_Lane_1 to the control circuit CC11 of the transmitting device TX11 through the transmitting device TX21 and the receiving device RX11. The control circuit CC11 may obtain information on whether any one of the native lanes Lane_1 to Lane_4 is determined as a degraded lane based on the lane quality information.

Figure 12A:
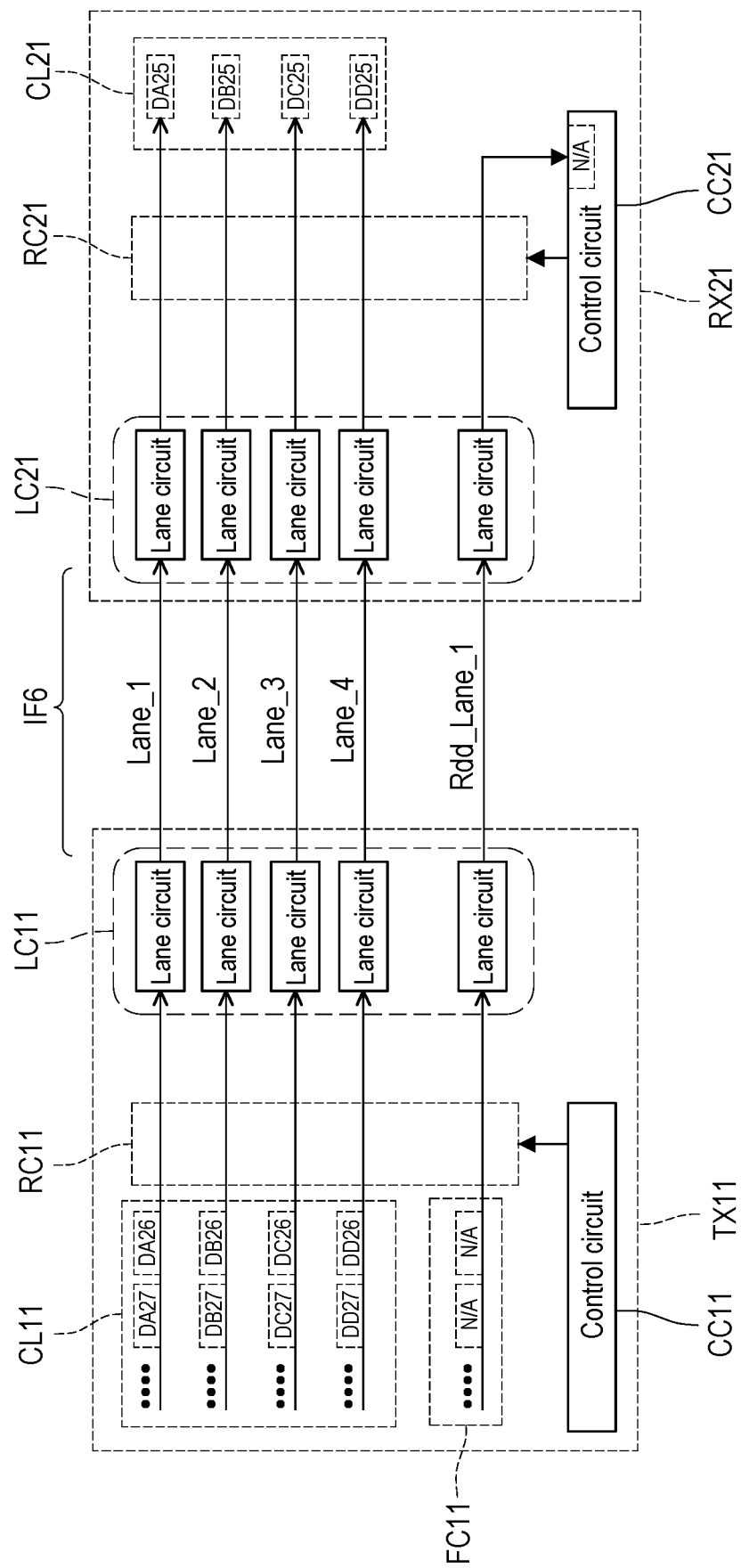
FIG. 12A to FIG. 12C are schematic diagrams of operation scenarios in which the transmitting device and the receiving device synchronously use the same redundant lane to repair the degraded lane.
Figure 12B:
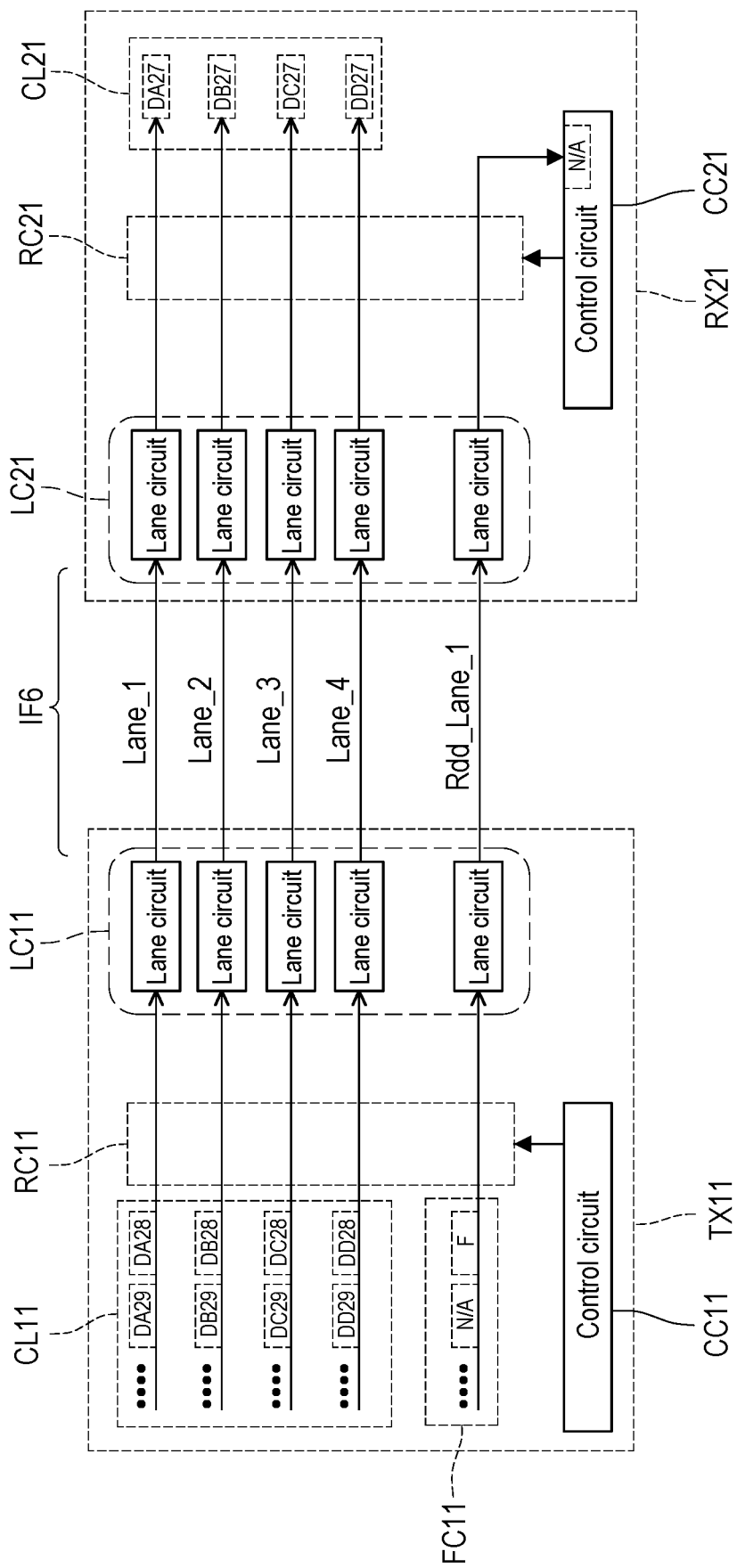
Figure 12C:
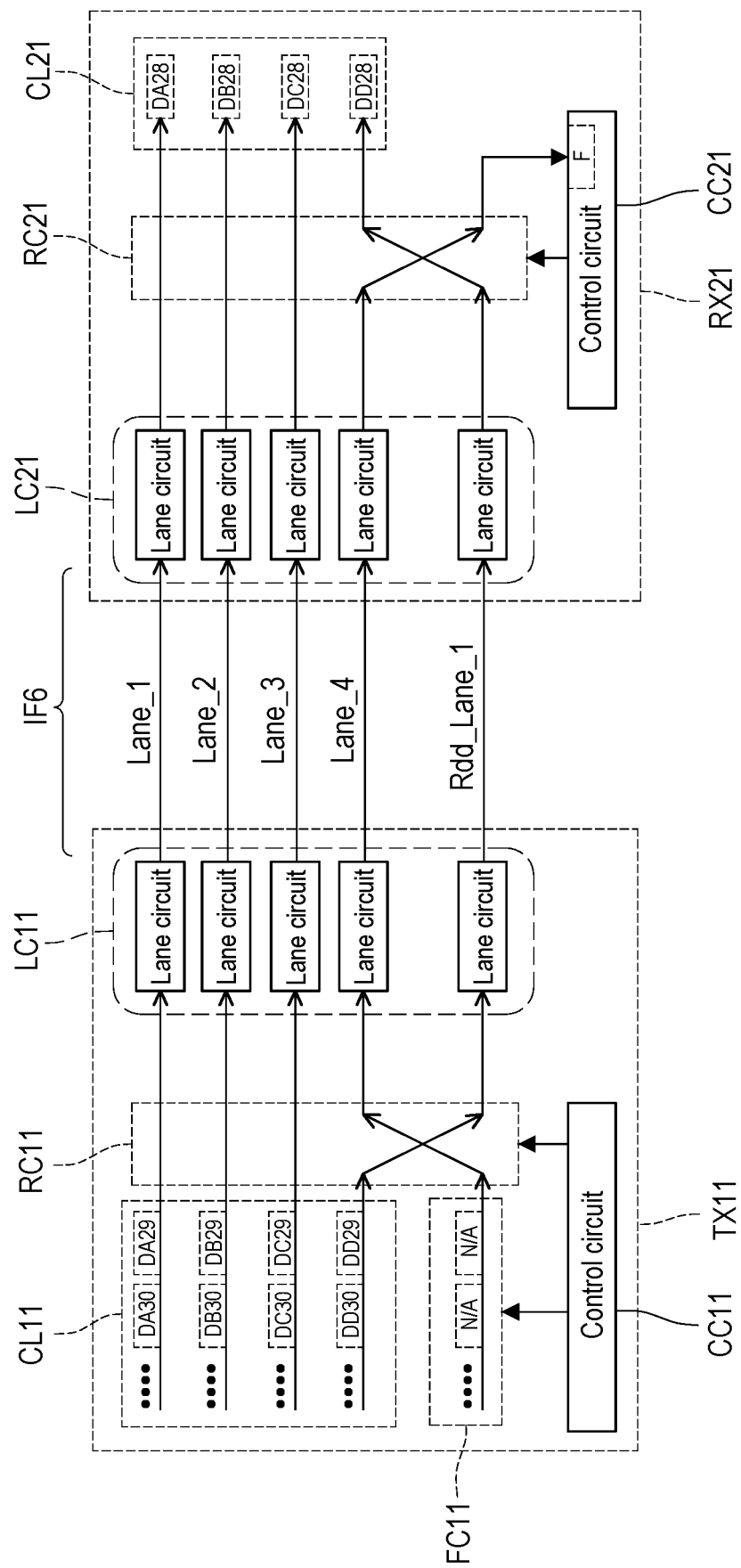

FIG. 12A to FIG. 12C are schematic diagrams of an operation scenario in which the transmitting device TX11 and the receiving device RX21 synchronously use the same redundant lane Rdd_Lane_1 to repair the degraded lane Lane_4. In the operation scenario example shown in FIG. 12A to FIG. 12C, the data units "DA25", "DA26", "DA27", "DA28", "DA29", and "DA30" represent different data units in the data unit stream transmitted by the native lane Lane_1, the data units "DB25", "DB26", "DB27", "DB28", "DB29", and "DB30" represent different data units in the data unit stream transmitted by the native lane Lane_2, the data units "DC25", "DC26", "DC27", "DC28", "DC29", and "DC30" represent different data units in the data unit stream transmitted by the native lane Lane_3, and the data units "DD25", "DD26", "DD27", "DD28", "DD29", and "DD30" represent different data units in the data unit stream transmitted by the native lane Lane_4. The operation scenario shown in FIG. 12A to FIG. 12C may be used as various operation scenarios of the specific embodiments shown in FIG. 10 or FIG. 11. It is assumed here that the native lane Lane_4 is determined to be a degraded lane, and the transmitting device TX11 transmits the redundant unit stream with the synchronization flag to the receiving device RX21 through the redundant lane Rdd_Lane_1.

In the operation scenario shown in FIG. 12A, the native lanes Lane_1, Lane_2, Lane_3, and Lane_4 are all determined to be good. Therefore, the routing circuit RC11 may transmit the data units "DA25", "DB25", "DC25", and "DD25" of these data unit streams from the coding layer circuit CL11 to the receiving device RX21 through the native lanes Lane_1 to Lane_4, and the routing circuit RC11 may transmit the redundant unit "N/A" (empty data unit) of the redundant unit stream from the flag circuit FC11 to the receiving device RX21 through the redundant lane Rdd_Lane_1. The routing circuit RC21 may transmit the data units "DA25", "DB25", "DC25", and "DD25" of different data unit streams from the native lanes Lane_1 to Lane_4 to the coding layer circuit CL21, and the control circuit CC21 may monitor the redundant unit stream of the redundant lane Rdd_Lane_1 through the routing circuit RC21 to detect whether there is a synchronization flag in the redundant unit stream.

In the operation scenario shown in FIG. 12B, it is assumed that the native lane Lane_4 is determined to be a degraded lane. During the continuous transmission process of these data unit streams by the native lanes Lane_1 to Lane_4, after the native lane Lane_4 is determined as a degraded lane, the flag circuit FC11 adds the synchronization flag "F" into the redundant unit stream at a corresponding timing. Therefore, the routing circuit RC11 may transmit the redundant unit stream with the synchronization flag "F" to the receiving device RX21 through the redundant lane Rdd_Lane_1 to notify the repair time point (synchronous switching time point of the lane) for the degraded lane Lane_4. At the time point shown in FIG. 12B, although the native lane Lane_4 has been determined to be a degraded lane, the flag circuit FC11 has not yet output the synchronization flag "F" to the control circuit CC21.

In the operation scenario shown in FIG. 12C, the flag circuit FC11 has output the synchronization flag "F" to the control circuit CC21. After the flag circuit FC11 outputs the synchronization flag "F" to the control circuit CC21, the routing circuit RC11 may perform route switching at the repair time point, so as to repair the degraded lane Lane_4 by using the redundant lane Rdd_Lane_1. Therefore, at the time point shown in FIG. 12C, the routing circuit RC11 changes the transmission targets of the data unit streams "DD29", "DD30", . . . output by the coding layer circuit CL11 from the degraded lane Lane_4 to the redundant lane Rdd_Lane_1, and changes the transmission targets of the redundant unit streams "N/A", "N/A", . . . output by the flag circuit FC11 from the redundant lane Rdd_Lane_1 to the degraded lane Lane_4. Based on the synchronization flag "F", the control circuit CC21 may obtain the route switching time point of the routing circuit RC11 (the repair time point for the degraded lane Lane_4), so the redundant lane Rdd_Lane_1 may be used to repair the degraded lane Lane_4 synchronously. Therefore, at the time point shown in FIG. 12C, the routing circuit RC21 may change the transmission target of the unit stream of the degraded lane Lane_4 from the coding layer circuit CL21 to the control circuit CC21, and change the transmission target of the unit stream of the redundant lane Rdd_Lane_1 from the control circuit CC21 to the coding layer circuit CL21.

Figure 13A:
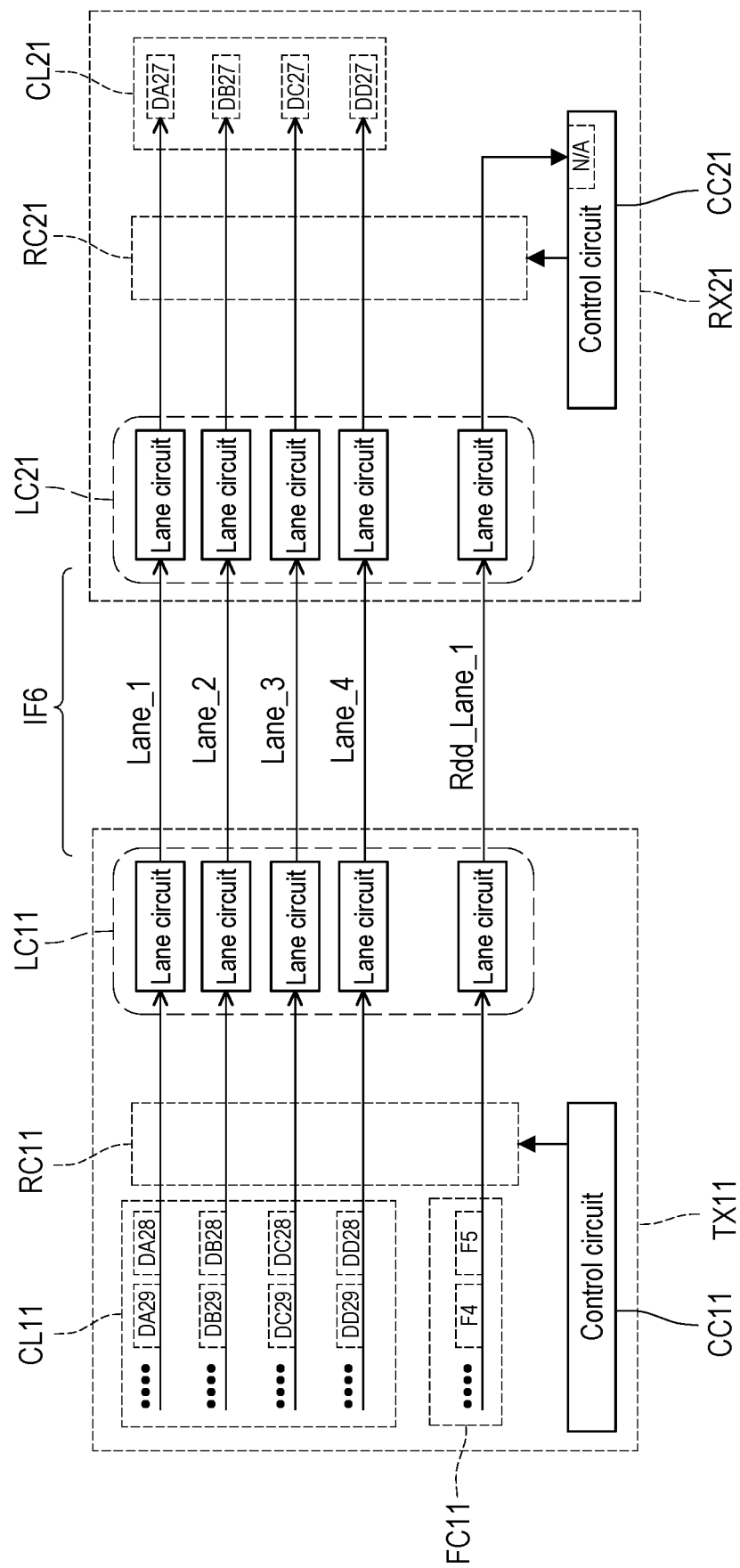
FIG. 13A to FIG. 13B are schematic diagrams of another operation scenarios in which the transmitting device and the receiving device synchronously use the same redundant lane to repair the degraded lane.
Figure 13B:
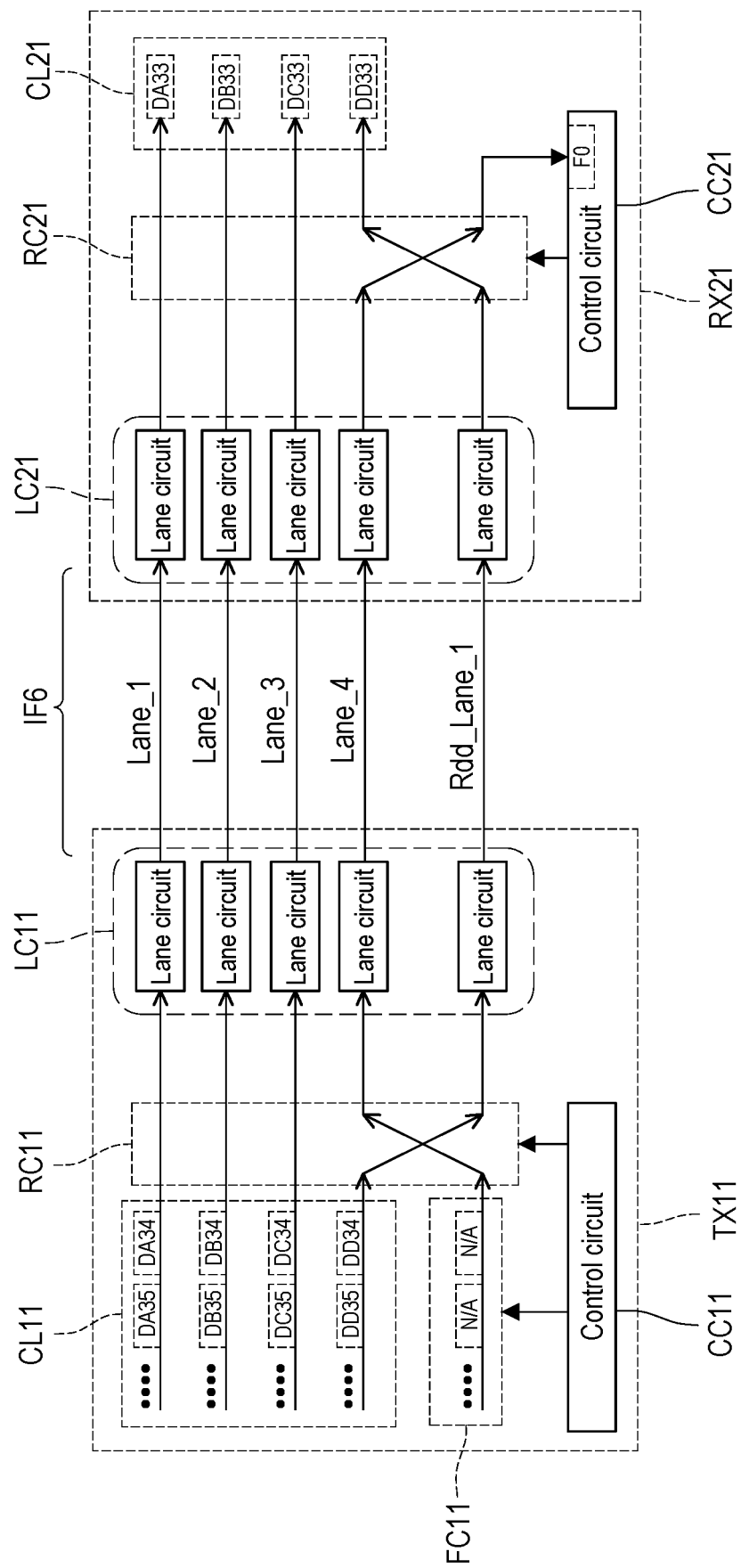

FIG. 13A to FIG. 13B are schematic diagrams of another operation scenarios in which the transmitting device TX11 and the receiving device RX21 synchronously use the same redundant lane Rdd_Lane_1 to repair the degraded lane Lane_4. The operation scenario shown in FIG. 12A and related descriptions are also applicable to the example shown in FIG. 13A to FIG. 13B. In the operation scenario shown in FIG. 13A, it is assumed that the native lane Lane_4 is determined to be a degraded lane. During the continuous transmission process of these data unit streams by the native lanes Lane_1 to Lane_4, after the native lane Lane_4 is determined as a degraded lane, the flag circuit FC11 adds multiple synchronization flags "F5", "F4", . . . , "F0" into the redundant unit stream at a corresponding timing. Therefore, the routing circuit RC11 may sequentially transmit the synchronization flags "F5", "F4", . . . , "F0" to the receiving device RX21 through the redundant lane Rdd_Lane_1 to notify the repair time point (synchronous switching time point of the lane) for the degraded lane Lane_4. At the time point shown in FIG. 13A, although the native lane Lane_4 has been determined to be a degraded lane, the flag circuit FC11 has not yet output the synchronization flags "F5" to "F0" to the control circuit CC21. The synchronization flags "F5" to "F0" have the function of "countdown". The routing circuit RC11 can notify the receiving device RX21 of the repair time point by using the synchronization flags "F5" to "F0" in a "countdown" manner, the control circuit CC21 of the receiving device RX21 knows the repair time point based on the "countdown" manner by using the synchronization flags "F5" to "F0".

In the operation scenario shown in FIG. 13B, the flag circuit FC11 has already output the last synchronization flag "F0" among the synchronization flags "F5" to "F0" to the control circuit CC21. After the flag circuit FC11 outputs the synchronization flag "F0" to the control circuit CC21, the routing circuit RC11 may perform route switching at the repair time point, so as to repair the degraded lane Lane_4 by using the redundant lane Rdd_Lane_1. Therefore, at the time point shown in FIG. 13B, the routing circuit RC11 changes the transmission targets of the data unit streams "DD34", "DD35", . . . output by the coding layer circuit CL11 from the degraded lane Lane_4 to the redundant lane Rdd_Lane_1, and changes the transmission targets of the redundant unit streams "N/A", "N/A", . . . output by the flag circuit FC11 from the redundant lane Rdd_Lane_1 to the degraded lane Lane_4. Based on the countdown function of the synchronization flags "F5" to "F0, the control circuit CC21 may obtain the route switching time point of the routing circuit RC11 (the repair time point for the degraded lane Lane_4), so the redundant lane Rdd_Lane_1 may be used to repair the degraded lane Lane_4 synchronously. Therefore, at the time point shown in FIG. 13B, the routing circuit RC21 may change the transmission target of the unit stream of the degraded lane Lane_4 from the coding layer circuit CL21 to the control circuit CC21, and change the transmission target of the unit stream of the redundant lane Rdd_Lane_1 from the control circuit CC21 to the coding layer circuit CL21.

According to different designs, in some embodiments, the control circuit CC11 and/or CC21 may be implemented by a hardware circuit. In other embodiments, the implementation of the control circuit CC11 and/or CC21 may be firmware, software (i.e., a program), or a combination of the two. In yet other embodiments, the implementation of the control circuit CC11 and/or CC21 may be a combination of hardware, firmware, and software.

In terms of hardware, the control circuit CC11 and/or CC21 may be implemented as a logic circuit on an integrated circuit. For example, the control circuit CC11 and/or CC21 may be implemented in one or more controllers, microcontrollers, microprocessors, application-specific integrated circuits (ASIC), digital signal processor (DSP), field programmable gate array (FPGA), and/or various logic blocks, modules, and circuits in other processing units. The related functions of the control circuit CC11 and/or CC21 may be implemented as hardware circuits by using hardware description languages (e.g., Verilog HDL or VHDL), or other suitable programming languages, such as various logic blocks, modules, and circuits in integrated circuits.

In terms of software and/or firmware, the related functions of the control circuit CC11 and/or CC21 may be implemented as programming codes. For example, the control circuit CC11 and/or CC21 may be implemented using general programming languages (e.g., C, C++, or assembly language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic device (e.g., a computer, a CPU, a controller, a microcontroller, or a microprocessor) may read and execute the programming code from the non-transitory machine-readable storage medium, thereby achieving related functions of the control circuit CC11 and/or CC21.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A communication system, comprising:
    a first transmitting device, disposed on a first die; and
    a first receiving device, disposed on a second die, wherein the first die and the second die are disposed in a same integrated circuit package, the first transmitting device transmits at least one first data unit stream to the first receiving device through at least one native lane,
    during a continuous transmission process of the at least one first data unit stream, after one of the at least one native lane is determined to be a degraded lane, the first transmitting device transmits at least one synchronization flag to the first receiving device through a redundant lane to notify a repair time point; and
    during the continuous transmission process of the at least one first data unit stream, the first transmitting device uses the redundant lane instead of the degraded lane based on the repair time point to continue data unit stream transmission of the first transmitting device, and the first receiving device uses the redundant lane instead of the degraded lane based on the repair time point notified by the at least one synchronization flag to continue data unit stream reception of the first receiving device.

2. The communication system according to claim 1, wherein the first transmitting device comprises:
    a coding layer, providing the at least one first data unit stream;
    a flag circuit, providing a redundant unit stream; and
    a routing circuit, coupled to the coding layer circuit to receive the at least one first data unit stream, and coupled to the flag circuit to receive the redundancy unit stream, wherein,
    during the continuous transmission process of the at least one first data unit stream, when the at least one native lane is determined to be good, the routing circuit transmits the at least one first data unit stream to the first receiving device through the at least one native lane, and transmits the redundant unit stream to the first receiving device through the redundant lane;
    during the continuous transmission process of the at least one first data unit stream, after the one of the at least one native lane is determined to be the degraded lane, the flag circuit generates the at least one synchronization flag, the flag circuit adds the at least one synchronization flag into the redundant unit stream at a corresponding timing, and the routing circuit transmits the redundant unit stream with the at least one synchronization flag to the first receiving device through the redundant lane to notify the repair time point; and
    during the continuous transmission process of the at least one first data unit stream, the routing circuit uses the redundant lane instead of the degraded lane based on the repair time point to continue the data unit stream transmission of the first transmitting device.

3. The communication system according to claim 2, wherein the first transmitting device further comprises:
    a control circuit, coupled to the routing circuit and the flag circuit, wherein the control circuit receives lane quality information through a communication path,
    after the lane quality information indicates that the one of the at least one native lane is determined to be the degraded lane, the control circuit controls the flag circuit to add the at least one synchronization flag into the redundancy unit stream at the corresponding timing, the control circuit controls the routing circuit to transmit the redundant unit stream with the at least one synchronization flag to the first receiving device through the redundant lane to notify the repair time point, and the control circuit controls the routing circuit to use the redundant lane instead of the degraded lane based on the repair time point to continue the data unit stream transmission of the first transmitting device.

4. The communication system according to claim 3, wherein the communication path comprises a sideband path between the first die and the second die.

5. The communication system according to claim 3, wherein the communication path comprises an I²C transmission interface between the first die and the second die.

6. The communication system according to claim 3, wherein the communication path comprises a data transmission path between the first die and the second die, and the second die transmits at least one second data unit stream to the first die through the data transmission path.

7. The communication system according to claim 6, further comprising:
    a second transmitting device, disposed on the second die; and
    a second receiving device, disposed on the first die, wherein the second receiving device receives the at least one second data unit stream from the second transmitting device through the data transmission path, the first receiving device transmits the lane quality information to the first transmitting device through the second transmitting device and the second receiving device, and the lane quality information indicates whether any of the at least one native lane is determined to be the degraded lane.

8. The communication system according to claim 3, wherein the communication path comprises an external path outside the integrated circuit package.

9. The communication system according to claim 3, wherein the at least one synchronization flag includes a plurality of synchronization flags, and the routing circuit notifies the receiving device of the repair time point by using the synchronization flags in a "countdown" manner.

10. The communication system according to claim 1, wherein the first receiving device comprises:
   a coding layer circuit;
   a routing circuit, coupled to the coding layer circuit;
   a control circuit, coupled to the routing circuit, wherein, after the control circuit receives the at least one synchronization flag from the redundant lane through the routing circuit, the control circuit controls the routing circuit to use the redundant lane instead of the degraded lane based on the repair time point notified by the at least one synchronization flag to continue the data unit stream reception of the first receiving device.

11. The communication system according to claim 10, wherein the at least one synchronization flag includes a plurality of synchronization flags, and the control circuit obtains the repair time point based on a "countdown" manner by using the synchronization flags.

12. The communication system according to claim 10, wherein the first receiving device further comprises:
   a plurality of signal quality monitoring circuits, respectively disposed on the at least one native lane and the redundant lane, wherein the control circuit monitors signal quality of the at least one native lane and the redundant lane through the signal quality monitoring circuits, the control circuit determines whether any one of the at least one native lane is the degraded lane based on the signal quality of the at least one native lane, and the control circuit notifies the first transmitting device which one of the at least one native lane is the degraded lane through a communication path.

13. A repairing method for lanes between dies, comprising:
   transmitting at least one first data unit stream by a first transmitting device disposed on a first die to a first receiving device disposed on a second die through at least one native lane, wherein the first die and the second die are disposed in a same integrated circuit package;
   transmitting, by the first transmitting device, at least one synchronization flag to the first receiving device through a redundant lane to notify a repair time point during a continuous transmission process of the at least one first data unit stream and after one of the at least one native lane is determined to be a degraded lane;
   using, by the first transmitting device, the redundant lane instead of the degraded lane based on the repair time point to continue data unit stream transmission of the first transmitting device during the continuous transmission process of the at least one first data unit stream; and
   using, by the first receiving device, the redundant lane instead of the degraded lane based on the repair time point notified by the at least one synchronization flag to continue data unit stream reception of the first receiving device during the continuous transmission process of the at least one first data unit stream.

14. The repairing method according to claim 13, further comprising:
   providing the at least one first data unit stream by a coding layer of the first transmitting device;
   providing a redundant unit stream by a flag circuit of the first transmitting device; and
   transmitting the at least one first data unit stream to the first receiving device through the at least one native lane by a routing circuit of the first transmitting device, and transmitting the redundant unit stream to the first receiving device through the redundant lane by the routing circuit during the continuous transmission process of the at least one first data unit stream and when the at least one native lane is determined to be good;
   generating the at least one synchronization flag by the flag circuit, adding the at least one synchronization flag into the redundant unit stream at a corresponding timing by the flag circuit, and transmitting the redundant unit stream with the at least one synchronization flag to the first receiving device through the redundant lane by the routing circuit to notify the repair time point during the continuous transmission process of the at least one first data unit stream and after one of the at least one native lane is determined to be the degraded lane; and
   using the redundant lane instead of the degraded lane based on the repair time point by the routing circuit to continue the data unit stream transmission of the first transmitting device during the continuous transmission process of the at least one first data unit stream.

15. The repairing method according to claim 14, further comprising:
   receiving lane quality information through a communication path by a control circuit of the first receiving device; and
   controlling the flag circuit to add the at least one synchronization flag into the redundancy unit stream at the corresponding timing by the control circuit, controlling the routing circuit to transmit the redundant unit stream with the at least one synchronization flag to the first receiving device through the redundant lane by the control circuit to notify the repair time point, and controlling the routing circuit to use the redundant lane instead of the degraded lane based on the repair time point by the control circuit to continue the data unit stream transmission of the first transmitting device after the lane quality information indicates that the one of the at least one native lane is determined to be the degraded lane.

16. The repairing method according to claim 15, wherein the communication path comprises a sideband path between the first die and the second die.

17. The repairing method according to claim 15, wherein the communication path comprises an I$^2$C transmission interface between the first die and the second die.

18. The repairing method according to claim 15, wherein the communication path comprises a data transmission path between the first die and the second die, and the second die transmits at least one second data unit stream to the first die through the data transmission path.

19. The repairing method according to claim 18, further comprising:
   receiving the at least one second data unit stream from a second transmitting device disposed on the second die through the data transmission path by a second receiving device disposed on the first die; and
   transmitting the lane quality information to the first transmitting device through the second transmitting device and the second receiving device by the first receiving device, wherein the lane quality information indicates whether any of the at least one native lane is determined to be the degraded lane.

20. The repairing method according to claim 15, wherein the communication path comprises an external path outside the integrated circuit package.

21. The repairing method according to claim 15, wherein the at least one synchronization flag includes a plurality of synchronization flags, and the repairing method further comprises:
   notifying, by the routing circuit, the receiving device of the repair time point by using the synchronization flags in a "countdown" manner.

22. The repairing method according to claim 13, further comprising:
   controlling, by a control circuit of the first receiving device, a routing circuit of the first receiving device to use the redundant lane instead of the degraded lane based on the repair time point notified by the at least one synchronization flag to continue the data unit stream reception of the first receiving device after the control circuit receives the at least one synchronization flag from the redundant lane through the routing circuit.

23. The repairing method according to claim 22, wherein the at least one synchronization flag includes a plurality of synchronization flags, and the repairing method further comprises:
   obtaining, by the control circuit, the repair time point based on a "countdown" manner by using the synchronization flags.

24. The repairing method according to claim 22, further comprising:
   disposing a plurality of signal quality monitoring circuits on the at least one native lane and the redundant lane;
   monitoring signal quality of the at least one native lane and the redundant lane through the signal quality monitoring circuits by the control circuit;
   determining whether any one of the at least one native lane is the degraded lane based on the signal quality of the at least one native lane by the control circuit; and
   notifying the first transmitting device which one of the at least one native lane is the degraded lane through a communication path by the control circuit.

\* \* \* \* \*